(12) United States Patent
Gabel et al.

(10) Patent No.: US 11,922,641 B2
(45) Date of Patent: *Mar. 5, 2024

(54) METHOD AND APPARATUS FOR ADAPTIVE TRAILER CONTENT MONITORING

(71) Applicant: FORD GLOBAL TECHNOLOGIES, LLC, Dearborn, MI (US)

(72) Inventors: Brian Gabel, Novi, MI (US); Joshua Sharpe, Birmingham, MI (US); Keith Weston, Canton, MI (US); Andrew Brown, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 44 days.

This patent is subject to a terminal disclaimer.

(21) Appl. No.: 17/352,639

(22) Filed: Jun. 21, 2021

(65) Prior Publication Data
US 2021/0312643 A1 Oct. 7, 2021

Related U.S. Application Data

(62) Division of application No. 16/288,461, filed on Feb. 28, 2019, now Pat. No. 11,062,463.

(51) Int. Cl.
*G06T 7/246* (2017.01)
*B60R 1/00* (2022.01)
(Continued)

(52) U.S. Cl.
CPC .............. *G06T 7/248* (2017.01); *B60R 1/002* (2013.01); *B60R 11/04* (2013.01); *G06T 7/194* (2017.01);
(Continued)

(58) Field of Classification Search
None
See application file for complete search history.

(56) References Cited

U.S. PATENT DOCUMENTS

| 7,633,383 B2 | 12/2009 | Dunsmoir et al. |
| 7,932,815 B2 * | 4/2011 | Martinez ................. B60D 1/62 340/539.23 |
| 2014/0036072 A1 * | 2/2014 | Lyall ...................... G06V 20/52 348/143 |

(Continued)

OTHER PUBLICATIONS

L. Guezouli and H. Belhani, "Automatic Detection of Moving Objects in Video Surveillance," 2016 Global Summit on Computer & Information Technology (GSCIT), 2016, pp. 70-75, doi: 10.1109/GSCIT.2016.14.*

(Continued)

*Primary Examiner* — Jiangeng Sun
(74) *Attorney, Agent, or Firm* — Joseph Zane; Brooks Kushman P.C.

(57) ABSTRACT

A load-monitoring system includes a vehicle processor and a camera mounted in a trailer. The vehicle, via the processor, displays a first image of a trailer load, received from a trailer-mounted camera and receives selection of a monitoring point on the image, via a touch-sensitive user interface displaying the image or other selection mechanism. The vehicle also receives selection of a fixed point on the image, via the user interface. If the monitoring point moves more than a threshold amount, relative to the fixed point, for example, in subsequent images captured by the camera, the vehicle alerts the driver.

20 Claims, 4 Drawing Sheets

(51) Int. Cl.
  *B60R 11/04* (2006.01)
  *G06F 3/04842* (2022.01)
  *G06T 7/194* (2017.01)
  *G06T 7/215* (2017.01)
  *G06T 7/55* (2017.01)
  *H04N 5/272* (2006.01)

(52) U.S. Cl.
  CPC ............... *G06T 7/215* (2017.01); *G06T 7/55* (2017.01); *H04N 5/272* (2013.01); *B60R 2300/304* (2013.01); *B60R 2300/70* (2013.01); *G06F 3/04842* (2013.01); *G06T 2207/30252* (2013.01)

(56) References Cited

U.S. PATENT DOCUMENTS

| | | | |
|---|---|---|---|
| 2015/0012207 A1* | 1/2015 | Tate, Jr. | G01C 21/3469 |
| | | | 701/123 |
| 2015/0172518 A1 | 6/2015 | Lucas et al. | |
| 2016/0297361 A1* | 10/2016 | Drazan | H04N 5/2256 |
| 2017/0129403 A1 | 5/2017 | Lavoie | |
| 2017/0262717 A1* | 9/2017 | Drazan | H04N 7/181 |
| 2017/0280068 A1 | 9/2017 | Shin et al. | |
| 2017/0341583 A1* | 11/2017 | Zhang | H04N 7/181 |
| 2017/0372484 A1* | 12/2017 | Carlson | G06T 7/269 |
| 2018/0157932 A1 | 6/2018 | Gu et al. | |
| 2018/0208196 A1 | 7/2018 | Kurata | |
| 2018/0255443 A1 | 9/2018 | Arena | |

OTHER PUBLICATIONS

Guezouli, Larbi, and Hanane Belhani. "Automatic detection of moving objects in video surveillance." 2016 Global Summit on Computer & Information Technology (GSCIT). IEEE, 2016.

"How Motion Detection Cameras Work." Network World. Dec. 31, 2014. 6 Pages.

* cited by examiner

METHOD AND APPARATUS FOR ADAPTIVE TRAILER CONTENT MONITORING

CROSS-REFERENCE TO RELATED APPLICATIONS

This application is a division of U.S. application Ser. No. 16/288,461 filed Feb. 28, 2019, now U.S. Pat. No. 11,062,463, issued on Jul. 13, 2021, the disclosure of which is hereby incorporated in its entirety by reference herein.

TECHNICAL FIELD

The illustrative embodiments generally relate to methods and apparatuses for adaptive trailer content monitoring.

BACKGROUND

Hauling content in a trailer attached to a vehicle is a common practice, but it can create undesirable situations for vehicle operators. One common issue with such hauling is that trailer load contents can shift during travel. This can create load-imbalance issues, causing danger to the vehicle, or it can result in damage to the trailer contents.

Drivers may address the preceding issue by frequently stopping and checking the state of the load, which is often necessary because the internal contents of the trailer are not viewable from an external position. To somewhat improve this situation, it has been proposed to mount a camera in the trailer but viewing a live-feed of the trailer while driving can be distracting, and it is often not always apparent when a load has shifted or a tie has come loose.

SUMMARY

In a first illustrative embodiment a system includes a processor configured to display a first image of a trailer load, received from a trailer-mounted camera. The processor is also configured to receive selection of a monitoring point on the image, via a user interface displaying the image and receive selection of a fixed point on the image, via the user interface. The processor is further configured to display an alert a vehicle occupant responsive to determining the monitoring point has moved, from the perspective of the camera, more than a predefined threshold amount relative to the fixed point, based on a comparison of the first image to a second image received from the camera.

In a second illustrative embodiment, a system includes a processor configured to receive a test image of a trailer load, from a trailer-mounted camera. The processor is also configured to compare the test image to a stored image of a reference trailer load. Further, responsive to a match of the test image to the stored image, the processor is configured to compare a predefined monitoring point from the stored image to the test image to identify the monitoring point in the test image. The processor is also configured to, responsive to identifying the monitoring point in the test image, set the monitoring point in the test image as a point to be monitored for movement, by the processor, in subsequent images received from the camera as a vehicle travels.

In a third illustrative embodiment, a method includes receiving selection of a monitoring point on a first image displayed to a display of a vehicle, the first image being captured from a trailer-mounted camera. The method also includes identifying a first set of pixels associated with the monitoring point for monitoring in a subsequent image received from the camera while the vehicle is moving.

Further, the method includes overlaying the first set of pixels onto to the subsequent image to determine if a second set of pixels corresponding to the first set of pixels has changed by more than a predefined threshold amount, the change being measured by at least one of shape represented by the first set of pixels in the subsequent image or location of the first set of pixels in the subsequent image. The method additionally includes alerting a driver responsive to the change beyond the predefined threshold.

DETAILED DESCRIPTION

As required, detailed embodiments are disclosed herein; it is to be understood, however, that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

As previously noted, mounting a camera capable of a live-feed to a trailer, within the trailer, is a proposed solution to the problem of monitoring trailer contents while driving. Among other problems, this setup can result in increased driver distraction (as the driver tries to view the load, live, while driving, to determine if a change has occurred) and may result in overlooking a non-obvious problem (such as a loose strap against a cluttered background of other images).

The illustrative embodiments utilize a trailer-mounted camera but improve such camera systems by providing analysis of the viewed image, so that a driver can be notified if a shift has occurred and/or so that key elements can be quickly isolated and checked for a state-change (e.g., a strap has come loose or moved).

Figure 1:
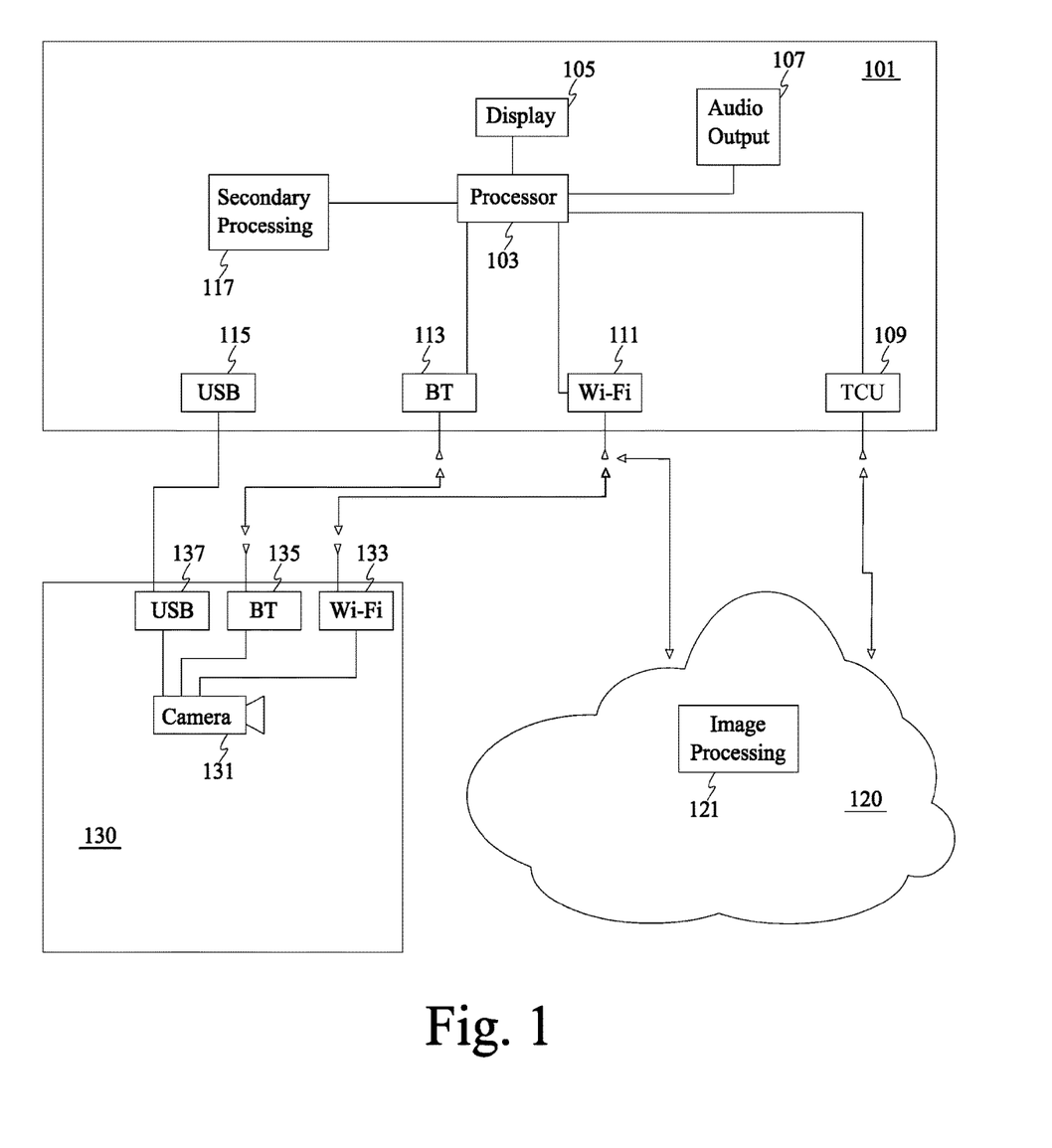
FIG. 1 shows an illustrative trailer monitoring system.

FIG. 1 shows an illustrative trailer monitoring system 100. In this illustrative example, a vehicle 101 includes onboard processing capability in the form of a processor 103, as well as including a display 105 capable of displaying both alerts and, if desired, one or more images from a trailer-mounted camera 131. The vehicle 101 may additionally include audio output 107, so that the vehicle 101 can notify a user of an alert without having to show a displayed image or if the display 105 is otherwise being used (such as for navigation purposes). The user may also be able to interact with the display 105 if it is provided, for example, with a touch-sensitive screen. In another illustrative embodiment, the interaction occurs through, for example, button presses, spoken dialog system with automatic speech recognition and speech synthesis.

In this example, the vehicle 101 also includes a telematics control unit (TCU) 109 capable of cloud 120 communication. This can allow the vehicle 101 to offload images via a cellular connection, to the cloud 120, if offboard image processing 121 is desired. Such communication may also be achieved through use of a Wi-Fi 111 module provided to the vehicle 101 and connected to an external network.

The vehicle 101 may also include additional connection interfaces, such as BLUETOOTH 113 and/or universal serial bus (USB) 115 connections. Any of the Wi-Fi 111, BLUETOOTH 113 and/or USB 115 connections could be used to connect to a trailering system camera 131. The trailer 130 may include both the camera 131 and a variety of communication connections. In this example, those can include Wi-Fi connections 133, BLUETOOTH connections 135 and a USB connection 137. If a wired connection, such as USB is used, there will typically be a physical linkage between the trailer 130 and the vehicle 101, such as a linkage used for lighting the brake-lights on a trailer 130. This linkage could include a data connection and could be used to directly relay signals to the processor 103 from the camera 131 via a wired connection. BLUETOOTH is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication format that can be used in this realm is free-space optical communication non-standardized consumer IR protocols.

The processor 103 may also include additional processing or algorithms 117 for image analysis, in order to analyze the images from the camera 131 as discussed in greater detail below. As noted, this analysis can also be performed on the cloud 120 via cloud image processing 121 or could be performed by a processor (not shown) provided to the camera 131, depending on the arrangement desired. Provided within the vehicle, the processor 103 allows for onboard processing of commands and routines. Further, the processor 103 is connected to both non-persistent and persistent storage. In general, persistent storage can include all forms of memory that maintain data when a computer or other device is powered down. These include, but are not limited to, HDDs, compact discs (CDs), digital video discs (DVDs), magnetic tapes, solid state drives, portable universal serial bus (USB) drives and any other suitable form of persistent memory. Non-persistent storage included memory such as random access memory (RAM), which can be deleted when the vehicle is powered down.

In addition to having exemplary processes executed by a vehicle computing system located in a vehicle 101, in certain embodiments, the exemplary processes may be executed by a computing system in communication with a vehicle computing system. Such a system may include, but is not limited to, a wireless device (e.g., and without limitation, a mobile phone) or a remote computing system 120 (e.g., and without limitation, a server on a remote network 120) connected to the vehicle 101. Collectively, such systems may be referred to as vehicle associated computing systems (VACS). In certain embodiments particular components of the VACS may perform particular portions of a process depending on the particular implementation of the system. By way of example and not limitation, if a process has a step of sending to or receiving information from a paired wireless device, such as camera 131, then it is likely that the wireless device is not performing that portion of the process, since the wireless device 131 would not send and receive information with itself. One of ordinary skill in the art will understand when it is inappropriate to apply a particular VACS to a given solution.

By using a baseline image obtained when a vehicle trailer 130 is properly and satisfactorily loaded and secured, and by recognizing changes to that image via the processing 117, 121, the vehicle 101 is capable of automatically detecting a change in a load state, and advising a driver of the change without requiring the driver to constantly watch a live-feed of the trailer contents on a vehicle display 105. In response to an alert, the vehicle 101 may show an image of the trailer on the display 101, but in this instance the driver will have already been alerted to the change and/or the vehicle 101 may visually identify the parts of the image that have changed, which represented the basis for the alert.

Figure 2:
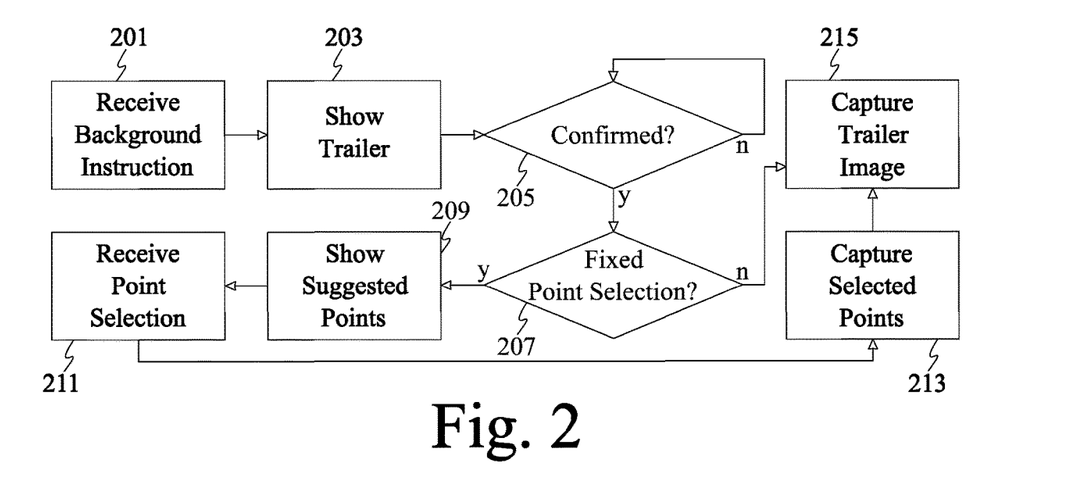
FIG. 2 shows an illustrative background configuration process.

FIG. 2 shows an illustrative background configuration process executable by the vehicle processor 103, for example. The vehicle 101 may receive indication from a user that a trailer 130 is loaded and is currently empty at 201. This will allow the process to establish a static background for what an empty trailer 130 looks like. This process may be most useful to people who commonly use the same trailer 130 repeatedly, as it will aid in allowing automatic identification of a load as is discussed in conjunction with some of the later figures.

In this example, the vehicle 101 shows an image of the empty trailer 130 at 203, obtained from the camera 131 viewing the trailer interior. The user confirms at 205 that the trailer 130 is, in fact, empty, or the user can exit the vehicle 101 and ensure the trailer 130 is empty when it is not.

The user also has an option to initiate baseline fixed point selection 207 during this process. One of the techniques discussed illustratively herein includes use of one or more fixed points (points that persist on a trailer interior surface, for example) and these points will commonly include visually distinct features such as tie-downs, lighting, or other visual anomalies that remain fixed in place while a trailer 130 moves.

If the user elects fixed point selection at 207, the vehicle highlights one or more suggested fixed points at 209. This step is not necessary, but it can aid the user in selecting fixed points that are easily identifiable as visually distinct as evaluated by the vehicle 101. This can help avoid having the user select a point that is not readily identifiable.

The user may then select one or more fixed points, which can also include the user highlighting or drawing a border around non-identified points if the user prefers. The vehicle receives the point selection at 211 and saves the selected points at 213 (or point coordinates/pixels) as part of the capture of an image of the empty trailer interior at 215.

By using the baseline image establish through this process, the vehicle 101 can quickly determine if a load has been added to the trailer 130, because the image will change under that circumstance. By using preselected fixed points, the processes that compare load-points to fixed-points can be configured more quickly, provided that one or more preselected fixed points is visible in the loaded trailer 130.

Figure 3:
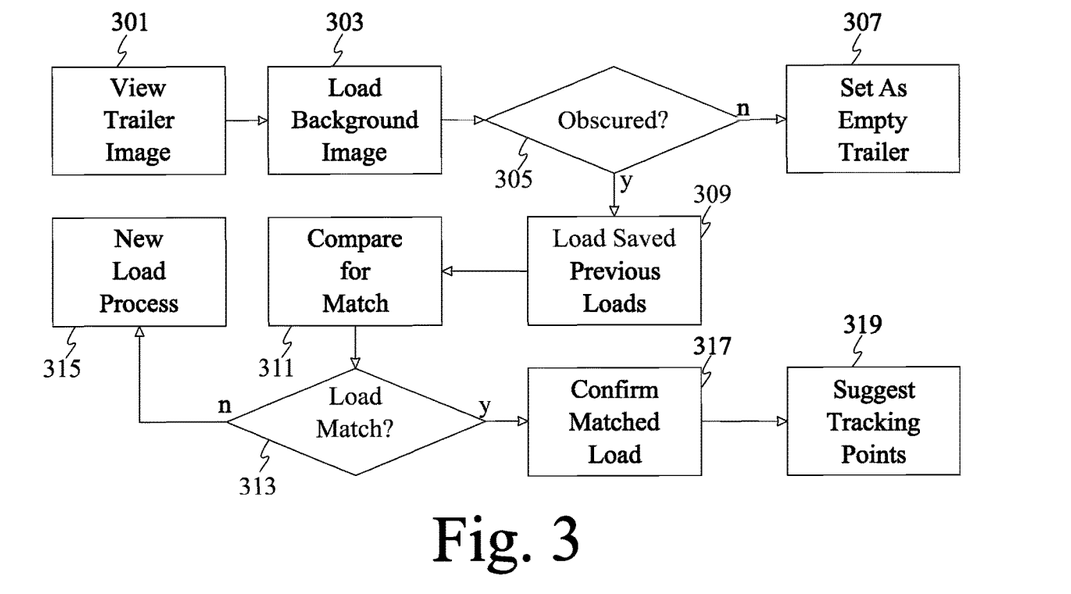
FIG. 3 shows an illustrative content-detection process.

FIG. 3 shows an illustrative content-detection process, executable, for example, by a vehicle processor 103, secondary processing 117 or the cloud analysis process 121. In this example, the vehicle 101 receives a live image of the trailer 130 from the camera 131 at 301. The vehicle can also load a predefined baseline background image at 303, and determine if any portion(s) of the baseline image are obscured at 305. That is, in the present, live image, are there portions that correspond to the baseline background image that are not visible in the live image. This can be done by comparing the two images to determine changes to pixels and other image characteristics.

For example, even if a small box was placed in the trailer 130, as long as the box is visible to the camera 131, the box will obscure a portion of the pixels that are expected to be seen based on the baseline background image. If no pixels are obscured at 305, the vehicle 101 may determine the trailer to be empty at 307. Certain minor obscured pixels may be treated as no obscured pixels for evaluation purposes, to accommodate for dirt and trash in the trailer. Thus, in certain embodiments, more than a threshold number of pixels or threshold percentage of pixels may need to be obscured for a vehicle 101 to consider the image obscured.

If there are obscured pixels at 305, the vehicle 101 may also load a set of previously observed load-images at 309. These are images saved when a trailer 130 was previously loaded and may be used by the vehicle 101 to match a current load to previous loads. In this manner, if a trailer 130 is frequently loaded with the same contents, the vehicle 101 can recognize the loads and possibly even recognize user-designated tracking points, which are discussed later herein.

The vehicle 101 compares the previously loaded images at 311, to determine if there is a match between a present load and a previous load at 313. Loads may be matched by comparison of images, colors, wireframes and other characteristics determinable from a camera image, as even the same contents loaded twice will likely have at least some variance in appearance.

If there is a match to a previous load at 313, the vehicle 101 may confirm with the driver that the match is correct at 317. This can include, for example, presenting the previous load image to the driver on the display 105 and asking if the current load includes the same contents. If the driver confirms the load match, the vehicle may suggest monitoring points and/or fixed points at 319. This suggestion may be based on, for example, points chosen for monitoring based on the previous time(s) the similar load was present.

Even if the load is matched, if the vehicle 101 cannot identify recommended points, or if the driver declines to use the suggested points, the vehicle 101 may treat the load as though the load were not matched at 313, instead opting to treat the load as a new load at 315. With a new load, the driver will select monitoring points as described in FIG. 4. Additionally or alternatively, even if the recommended points are adopted by the driver, the driver may select additional monitoring points if desired.

Figure 4:
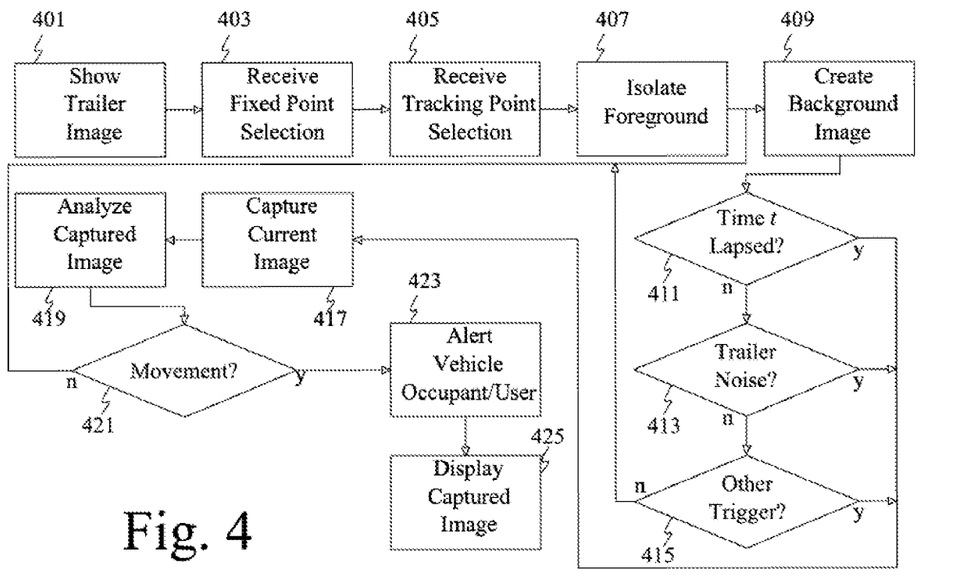
FIG. 4 shows an illustrative monitoring process.

FIG. 4 shows an illustrative monitoring process executable by, for example, a vehicle processor 103, additional processing 117 or cloud analysis 121. In this example, the process includes monitoring point configuration, but if monitoring points are already fixed (based on a common load, for example), the process can skip past the configuration to the monitoring setup at 407.

In this example, the vehicle 101 displays an image at 401 of the current trailer 130 contents as seen by the camera 131. The points are shown on a touch-sensitive display 105, and the user can thus select specific points for monitoring. For example, if a bike is secured to the trailer 130 by a tie-down strap, the user may select one or more points at 403 on the strap as monitoring points. Alternatively, selection of a point at 403 on the strap may cause software executing on the processor 103 to identify the whole object of the strap or strap portion associated with the selected point, treating the whole strap as selected.

For example, if a bike is secured to the trailer 130 by a tie-down strap, the user may select one or more points at 405 on the strap as monitoring points. Alternatively, selection of a point at 405 on the strap may cause software executing on the processor 103 to identify the whole object of the strap or strap portion associated with the selected point, treating the whole strap as selected.

Once all points have been selected for the foreground at 405, the vehicle 101 may isolate the selected points or objects as foreground images at 407. By doing this, the vehicle 101 may treat everything that is not selected as background, which may include non-selected portions of the load. The vehicle 101 uses this information to create a background image at 409. In at least one example, changes of the foreground images (selected points) relative to the background image (everything else) will help identify whether and to what degree movement has occurred.

In this example, there are several triggering events listed. These are illustrative in nature and are not the only possible triggering events that could cause reimaging of the trailer 130 contents. Further, the camera 131 may simply monitor the trailer 130 interior at periodic time intervals and may have no other triggers associated therewith.

In this example, the vehicle 101 determines if a predefined time period has passed at 411. This is one example of a triggering event, and can further be divided into multiple time periods relative to vehicle 101 states. For example, a first time period following initial movement, or movement after a stop, can be considered, and then subsequent time periods of the same or a different duration can be used while the vehicle 101 is underway.

Also, in this example, noise, detectable by a camera 131 microphone is used. This can include certain noises above a threshold level, or noises having characteristics indicative of a load shift (e.g., banging, sliding, etc). In this example, noises, definable by noise wave characteristics or matching to predefined parameters for noises, can be detected at 413. The camera 131 may also detect other triggers, such as bumps or sway, if the camera 131 includes one or more accelerometers. While a bump or sway may not mean a load has shifted, the bump or sway could cause a load shift, and thus may be a good example of a time to image the load via the camera 131.

If a triggering event occurs, the camera 131 captures an image of the load at 417 and sends the image to the vehicle processor 103 or other processor 117, 121 for analysis. The analysis compares the current image to the initial saved image to determine if any of the identified monitoring points have moved at 421. The analysis is described in illustrative detail with regards to FIG. 5.

If a monitoring point has moved at 421, this may be indicative of a load shift or a load that is about to shift. Consequently, the vehicle 101 may alert the user at 423 and display an image of the contents at 425 on a display 105. The user, knowing that there has been a change in, or may soon be a change in, load state, can then take appropriate action, without having to constantly watch a video of the load to see whether it is moving while the vehicle 101 travels.

Figure 5:
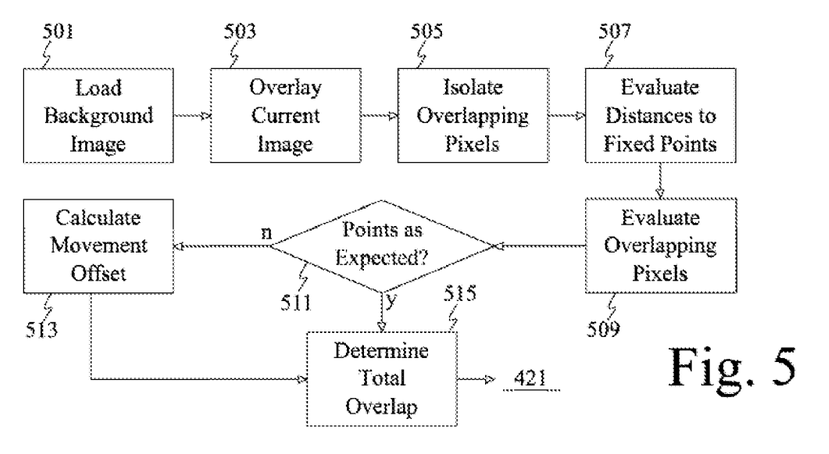
FIG. 5 shows an illustrative movement-detection process.

FIG. 5 shows an illustrative movement-detection process 419. In this example, the analysis processing occurring on the processor 103, 117, 121 loads a background image at 501. The background image consists of all portions of the image not selected for monitoring, created at 409 when the trailer 130 was loaded and the monitoring was configured. Onto this image, the vehicle 101 may overlay a present image of the load at 503. This overlay can reveal any shift in monitoring points, which are represented by the foreground image created at 407.

In this example, the vehicle 101 isolates the overlap at 505. The overlap is the change in foreground image position, either overlapping portions of the background image and/or relative to the fixed points selected during the configuration process. That is, for example, the vehicle 101 can determine one or both of the number of pixels of the background image now covered by the foreground image at 505 and/or the number of pixels between portions of the foreground image and the fixed point at 507, relative to what was previously observed at the time of configuration.

The vehicle 101 can evaluate the pixels at 509. Since straps and other portions may move somewhat during travel, even if a load is relatively fixed, the process may include some tolerance for change, so that only if a predefined number of pixels, percentage of pixels, or number/percentage relative to the total pixels in the foreground image, overlap, is an alert issued. This allows for some sway along the edges of the foreground image but should also allow for identifying a noteworthy change.

Also, in this example, the vehicle 101 determines if the fixed points are where they are expected to be, within the image, at 511. Because the user may have not actually selected a "fixed" fixed point, or because the camera viewpoint may have shifted due to excessive bumpiness, it may be possible to still perform the evaluation but with an offset to accommodate movement of fixed points. That is, because of the nature of perspective, if a fixed point shifts up and to the left, because a camera view shifted down and to the right, the relative distance between the fixed point and the monitoring point may have changed from the new perspective, even if the monitoring point did not move. By calculating an offset at 513 that reflects the movement of the fixed point, in the live image, relative to the baseline image, the same offset can be applied to the comparison of overlap and/or distance change to determine if true movement of anything other than the camera perspective has occurred.

If the fixed points remain where they are expected at 511 or if an offset is calculated at 513, the vehicle 101 can then determine the true overlap or distance change at 515. This can include determining a change in a number of pixels between a monitoring point pixel and a fixed object pixel, and/or a number of monitoring-point associated pixels that now overlap a portion of the established background image pixels. If the threshold of change is sufficient based on predefined movement settings (e.g., how much change constitutes noteworthy movement) at 421, the alert at 425 may occur.

Other examples of determining movement of monitoring points can include overlaying a set of pixels associated with a monitoring point onto a new image, to determine if the set of pixels corresponding to the monitoring point in the new image have changed in shape or location. That is, the vehicle 101 can recognize a change in the shape of the set (flex, compression or twist, for example) and/or a location of the set (loose or moving monitoring points) and determine based on predefined thresholds if this change warrants an alert.

Figure 6:
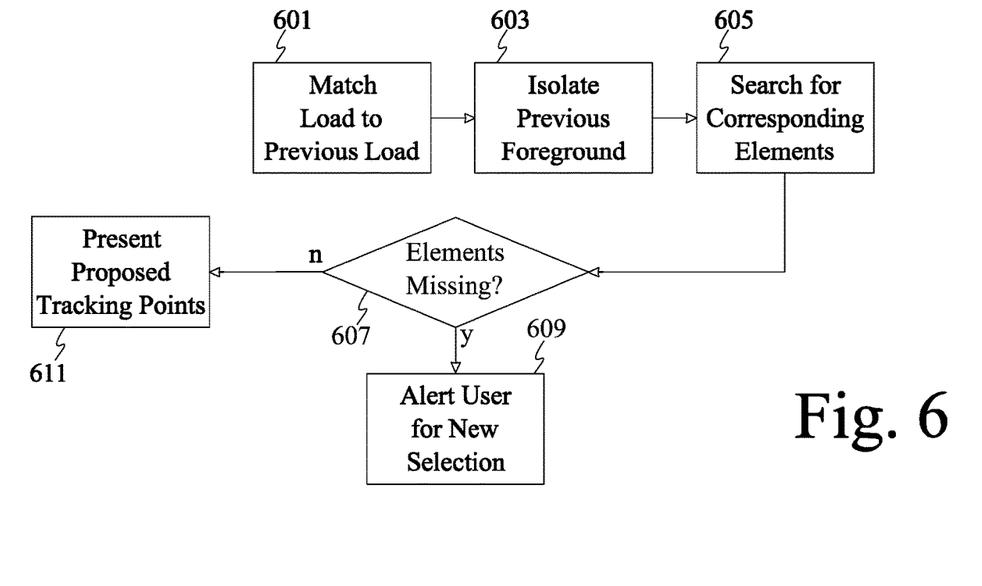
FIG. 6 shows an illustrative load-learning process.

FIG. 6 shows an illustrative load-learning process, executable by, for example, the processor 103. In this example, the vehicle 101 has matched a current load to a previously identified load at 601, as described with respect to FIG. 3. An alternative approach includes identifying a load as a load based on all the portions of the load overlapping an expected empty trailer background image.

In the illustrative example, the vehicle 101 isolates the proposed foreground at 603. This can include, for example, identifying the points of interest (monitoring points) that were previously associated with the matched load and determining if those points can be again visually identified at 605. For example, the vehicle 101 could search for straps or elements that match in color, size, affixation, etc.

If the expected monitoring points are missing at 607, the vehicle 101 may alert the user at 609, so that the user can select new monitoring points from the image of the current contents. Otherwise, the vehicle 101 can automatically propose the identified matched monitoring points at 611.

In the example where the vehicle 101 determines that a load exists based on a difference between a present image and an expected empty trailer 130 image, the vehicle 101 can determine monitoring points automatically by selecting some or all of the overlapping load image. That is, if the user does not want to specify monitoring points, the vehicle 101 can still determine the entire overlap represented by the load as a monitoring point set and can use a predefined fixed point or suggested visually distinct fixed point as the fixed reference point.

By allowing a user to specify monitoring points and/or by automatically identifying monitoring points, and by tracking the movement of the monitoring points relative to fixed points within a trailer, the illustrative embodiments allow for improved determination of load shifting and decreased driver distraction when a camera is used to monitor a load inside a trailer.

Computing devices described herein generally include computer-executable instructions where the instructions may be executable by one or more computing devices such as those listed above. Computer-executable instructions, such as those of the processes described herein, may be compiled or interpreted from computer programs created using a variety of programming languages and/or technologies, including, without limitation, and either alone or in combination, JAVA™, C, C++, C#, VISUAL BASIC, JAVASCRIPT, PYTHON, JAVASCRIPT, PERL, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety and are understood to be examples of types of processes that may be performed to achieve elements of the invention. Additional steps may be added or removed from the exemplary processes as desired.

With respect to the illustrative embodiments described in the figures showing illustrative process flows, it is noted that a general-purpose processor may be temporarily enabled as a special purpose processor for the purpose of executing some or all of the exemplary methods shown by these figures. When executing code providing instructions to perform some or all steps of the method, a processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a processor configured to:
display a first image of a trailer load, received from a trailer-mounted camera;
receive selection of a monitoring point on the image, via a user interface displaying the image;
receive selection of a fixed point on the image, via the user interface; and
display an alert a vehicle occupant responsive to determining the monitoring point has moved, from the perspective of the camera, more than a predefined threshold amount relative to the fixed point, the movement determined based on a comparison of pixels associated with the monitoring point relative to pixels associated with the fixed point in the first image compared to pixels associated with the monitoring point relative to pixels associated with the fixed point in a second image received from the camera.

2. The system of claim 1, wherein the processor is further configured to modify the first image or the second image to isolate the pixels associated with the monitoring point as a foreground.

3. The system of claim 2, wherein the processor is further configured to further modify the first image or the second image to set the remaining pixels, including the pixels associated with the fixed point, as a background.

4. The system of claim 3, wherein the processor is further configured to display the second image on a vehicle display, in conjunction with the alert.

5. The system of claim 4, wherein the processor is further configured to highlight the set of pixels associated with the monitoring point in the second image on the displayed second image.

6. The system of claim 3, wherein the processor is further configured to determine the monitoring point has moved more than the threshold amount based on overlap of more than a predefined threshold number of pixels of the foreground over pixels of the background in the second image, detectable by comparison to the first image and observing that one or more foreground pixels of the first image obscures one or more background pixels of the first image when considered from a perspective of the second image.

7. The system of claim 6, wherein the processor is further configured to display the second image on a vehicle display, in conjunction with the alert, and to highlight pixels corresponding to the overlap on the displayed second image.

8. The system of claim 3, wherein the processor is further configured to determine the monitoring point has moved based on a change in pixel count beyond a predefined threshold along a line between a preselected pixel of the foreground and a preselected pixel of the background, corresponding to the fixed point, in the second image, compared to a line connecting the preselected pixel of the foreground and the preselected pixel of the background in the first image.

9. The system of claim 8, wherein the processor is further configured to display the second image on a vehicle display, in conjunction with the alert and to highlight pixels corresponding to the line on the second image.

10. A method comprising:
displaying a first image of a trailer load, received from a trailer-mounted camera;
receiving selection of a monitoring point on the image, via a user interface displaying the image;
receiving selection of a fixed point on the image, via the user interface; and
displaying an alert a vehicle occupant responsive to determining the monitoring point has moved, from the perspective of the camera, more than a predefined threshold amount relative to the fixed point, the movement determined based on a comparison of pixels associated with the monitoring point relative to pixels associated with the fixed point in the first image compared to pixels associated with the monitoring point relative to pixels associated with the fixed point in a second image received from the camera.

11. The method of claim 10, further comprising modifying the first image or the second image to isolate the pixels associated with the monitoring point as a foreground.

12. The method of claim 11, further comprising modifying the first image or the second image to set the remaining pixels, including the pixels associated with the fixed point, as a background.

13. The method of claim 12, further comprising displaying the second image on a vehicle display, in conjunction with the alert.

14. The method of claim 13, further comprising highlighting the set of pixels associated with the monitoring point in the second image on the displayed second image.

15. The method of claim 12, further comprising determining the monitoring point has moved more than the threshold amount based on overlap of more than a predefined threshold number of pixels of the foreground over pixels of the background in the second image, detectable by comparison to the first image and observing that one or more foreground pixels of the first image obscures one or more background pixels of the first image when considered from a perspective of the second image.

16. The method of claim 15, further comprising displaying the second image on a vehicle display, in conjunction with the alert, and highlighting pixels corresponding to the overlap on the displayed second image.

17. The method of claim 12, further comprising determining the monitoring point has moved based on a change in pixel count beyond a predefined threshold along a line between a preselected pixel of the foreground and a preselected pixel of the background, corresponding to the fixed point in the second image, compared to a line connecting the preselected pixel of the foreground and the preselected pixel of the background in the first image.

18. The method of claim 17, further comprising displaying the second image on a vehicle display, in conjunction with the alert and highlighting pixels corresponding to the line on the second image.

19. A non-transitory storage medium storing instructions that, when executed, cause a processor of a vehicle to perform a method comprising:
displaying a first image of a trailer load, received from a trailer-mounted camera;
receiving selection of a monitoring point on the image, via a user interface displaying the image;
receiving selection of a fixed point on the image, via the user interface; and
displaying an alert a vehicle occupant responsive to determining the monitoring point has moved, from the perspective of the camera, more than a predefined threshold amount relative to the fixed point, the movement determined based on a comparison of pixels associated with the monitoring point relative to pixels associated with the fixed point in the first image compared to pixels associated with the monitoring point relative to pixels associated with the fixed point in a second image received from the camera.

20. The storage medium of claim 19, wherein the method further comprises:

modifying the first image or the second image to isolate the pixels associated with the monitoring point as a foreground;

modifying the first image or the second image to set the remaining pixels, including the pixels associated with the fixed point, as a background; and at least one of:

determining the monitoring point has moved more than the threshold amount based on overlap of more than a predefined threshold number of pixels of the foreground over pixels of the background in the second image, detectable by comparison to the first image and observing that one or more foreground pixels of the first image obscures one or more background pixels of the first image when considered from a perspective of the second image or determining the monitoring point has moved based on a change in pixel count beyond a predefined threshold along a line between a preselected pixel of the foreground and a preselected pixel of the background corresponding to the fixed point in the second image, compared to a line connecting the preselected pixel of the foreground and the preselected pixel of the background in the first image.

\* \* \* \* \*